United States Patent [19]

Holland-Letz

[11] Patent Number: 4,684,794
[45] Date of Patent: Aug. 4, 1987

[54] TRANSPORT DEVICE FOR CARD-LIKE RECORDING MEDIUM

[75] Inventor: Guenter Holland-Letz, Paderborn, Fed. Rep. of Germany

[73] Assignee: Nixdorf Computer AG, Paderborn, Fed. Rep. of Germany

[21] Appl. No.: 782,240

[22] Filed: Sep. 30, 1985

[30] Foreign Application Priority Data

Nov. 15, 1984 [DE] Fed. Rep. of Germany ....... 3441849

[51] Int. Cl.⁴ .............................................. G06K 7/08
[52] U.S. Cl. ........................................ 235/449; 360/2
[58] Field of Search ............................ 360/2; 235/449

[56] References Cited

U.S. PATENT DOCUMENTS 4,040,097  8/1977  Mizuno .................................. 360/2
4,181,920  1/1980  Cerekas ................................ 360/2
4,377,828  3/1983  Hayman ................................ 360/2

Primary Examiner—Harold I. Pitts
Attorney, Agent, or Firm—Cullen, Sloman, Cantor, Grauer, Scott & Rutherford

[57] ABSTRACT

In a device for friction-driven conveyance of a card-shaped recording medium (14), such as an I.D. card, relative to an evaluation device (16) which is situated on an extended linear transport path (36) between an inlet (38) and an outlet or reversal point (40), the linear transport path (36) is bordered on the one side by a section of a closed-loop conveyor (26) and on the other side by a pressure strip (28) which runs approximately parallel to the path (36) and is stressed toward the conveyor (26) with the aid of a pressure device (52). Rollers as active transport elements are thereby eliminated, insuring error-free transport of even deformed recording media.

20 Claims, 2 Drawing Figures

TRANSPORT DEVICE FOR CARD-LIKE RECORDING MEDIUM

TECHNICAL FIELD

This invention deals with a friction driven mechanism to transport a card-shaped recording medium, especially an I.D. card. The mechanism moves the card relative to a fixed evaluation device which is located on a straight line between the entrance and exit/reversal point of the reader.

BACKGROUND ART

Transport mechanisms of the type with which the present invention is concerned are used, for example, in automated money machines at I.D. (identification) check points. The identification cards may carry visible or invisible information symbols. The purpose of the transport mechanism is to accept the card when it is inserted at the entrance to the reader; it then moves the card past an evaluation device where the symbols are interpreted in order to determine whether or not the current holder is authorized to undertake a certain business transaction, e.g. remove money from a bank account. After the card is read, the mechanism may eject the card at an exit point which is separate from the entrance. Another possibility is to reverse the direction of transport when the card reaches a certain point within the mechanism (the reversal point). The card is then ejected through the inlet. The system which reads the cards operates on magnetic, electrostatic, or optical principles depending on how the information is stored on the card. When a card is to be identified and read, it must be moved at a uniform velocity and at the correct distance relative to the evaluation device in order to avoid mistakes in the evaluation.

Card-shaped recording media are usually made out of a plastic which is elastic yet resists bending. Nonetheless, these cards can get bent out of shape depending on how often they are used, how they are stored, and how old they are. If a bent card is transported past an evaluation device, the distance between it and the reader tends to vary because of the deformation of the card. Therefore, it is necessary to provide a transport mechanism which will accept deformed cards and convey them correctly past the evaluation device. The mechanisms which have been designed in the past are equipped with many costly and inefficient rollers, at least in the region around the evaluation device. The rollers usually push on both sides of the card. However, these roller-operated devices cannot adequately transport the card-shaped recording medium because the distance between the roller pairs relative to the overall length of the card is too large. Furthermore, these mechanisms are only conditionally able to transport a card past the evaluation device at a constant velocity since there are velocity peaks induced whenever a card is initially grabbed by a pair of rollers and whenever it leaves the influence of a roller pair. In addition, these kinds of devices tend to experience breakdowns which might be caused by a bent card wrapping itself around a roller, for example. Another problem arises when the force applied by a single pair of rollers is not sufficient to accelerate the recording medium as fast as desired. This problem leads back to the fact that the surface area which presses on the card is very small, this small surface area promotes particularly fast wear and smoothing of the roller, causing the force available to accelerate the card to decrease yet further. Roller readers have the additional disadvantage that the roller mechanism is costly to manufacture.

As is apparent from the foregoing, all of the problems associated with a roller reader are caused by using rollers as the only transport elements.

SUMMARY OF THE INVENTION

It is therefore an object of this invention to present a reader of the type described above which does not use rollers as active transport elements, at least in the region around the evaluation device. This object is satisfied in that a linear transport path is bordered on one side by a section of a closed-loop conveyor and on the other side by a pressure strip which may be moved toward the conveyor belt. The pressure strip is stressed toward the closed-loop conveyor by a pressure device.

By using a closed-loop conveyor in combination with a pressure strip, all of the previously explained disadvantages caused by the use of rollers as active transport elements may be avoided. The closed-loop belt of the conveyor may be pre-tensioned without any problems. Since the card-shaped recording medium is transported tightly pressed against the tightly stretched belt and the pressure strip, any possible curvature of the card in the longitudinal direction may be reliably eliminated which also works advantageously against curvature in the transverse direction of the card.

In a conveyance device according to the invention, a significant improvement in the motion of the recording medium is assured in comparison to the motion induced by roller mechanisms—at least in the area near the evaluation device. This is because the velocity disturbances caused when the card enters and exits from a pair of rollers may be avoided.

Because of the large surface area on the card over which the conveyor belt acts, this mechanism is able to accelerate the card quickly and pull it with great force. The risk of the conveyor belt getting smooth and worn is practically negligible because of the larger surface area over which force is applied as opposed to the small surface areas of a system which uses individual rollers. Furthermore, the conveyor belt is less susceptible to the dirt because of this large friction surface.

Additionally, the closed-loop conveyor is significantly easier to clean in comparison to a roller conveyor system because it is possible to clean the moving conveyor belt from a single point whereas the fixed points of the individual rollers must all be cleaned separately.

According to one aspect of the invention, the conveyor belt of the closed-loop conveyor is trained around at least one return pulley in the region of the entrance and the exit/reversal point. This results in an extended linear transport path in the area around the evaluation device. It is an advantage of this invention that one of these pulleys may be implemented as a drive roller.

According to another aspect of this invention, a supporting free-spinning roller is provided opposite to the evaluation device. The circumferential surface of the roller lies on the inner side of the conveyor belt. This assures that the conveyor belt pushes especially firmly on the recording medium in the area around the evaluation device. This further improves the possibility of obtaining an error-free evaluation.

To insure that the conveyor belt does not push the card too tightly in the area around the reversal point, the belt is displaced away from the pressure strip by the tail pulley. The displacement is approximately equal to half the thickness of the card-shaped recording medium. This eliminates the influence of the conveyor belt in a region around a roller where its velocity is somewhat irregular.

The previously mentioned velocity irregularities may be eliminated and a uniform transport of the card may be assured by using support and guide rollers which all have the same diameter.

According to still another aspect of the invention, all of the rollers which come into contact with the conveyor belt are equipped with at least one groove in which the guide rib of the conveyor belt lies. This keeps the conveyor belt from drifting from side to side.

The height of the rollers corresponds closely to the width of the conveyor belt. This assures that the conveyor belt, and with it the card-shaped recording medium, are held at right angles to their path of motion at least in the area around the evaluation device.

Even wide rollers can cause a side-to-side drift of the conveyor belt if their axes are not aligned exactly parallel to one another. In order to avoid this drift, it is advantageous to taper at least one of the two deflecting rollers so that its shape is that of a truncated cone on both sides of the diametrical plane which bisects the roller.

When the width of the conveyor belt corresponds closely to the width of the evaluation device, an especially large acceleration and driving force on the recording medium is guaranteed. This is an additional factor which insures interruption-free operation of the device.

As another feature of the invention, the thickness of the conveyor belt is less than 1 millimeter so that the pulling rope within the belt lies very close to its exterior surface. The circumferential conveyor belt speed in the region of the tail pulley is translated approximately identically to the conveyor belt speed on its straight section. The pulling rope is understood to be the place within the conveyor belt at which the vector sum of all forces acting on the belt acts. If the conveyor belt is made of a homogeneous material, the pulling rope is the same as the center of gravity of the belt's cross-section.

As another feature of the invention, the conveyor belt is made out of a flexible synthetic material, preferably a polyurethane mixture. The conveyor belt should be as flexible as possible in order to approximate the behavior of an ideal cable. The conveyor belt should travel around the pulleys as smoothly as possible so that only one small, uniform torque is required to drive the belt. Moreover, the belt should come off the rollers as nearly tangential as possible because motion which is not tangential would be load dependent and for that reason would lead to inaccuracies in the alignment. One additional reason to choose a synthetic material for the conveyor belt is that it is very wear resistant. An additional advantage derived by using a synthetic material, preferably a soft polyurethane mixture, is the high friction coefficient relative to most of the recording media which are also synthetic.

The conveyor belt should be designed with at least one inelastic pulling rope, preferably constructed out of steel cord or Kevlar, because otherwise, for example, the conveyor belt would unwind from the drive pulley load dependently, which would lead to inaccuracies in the conveyor feet.

The pulling rope(s) run on or directly under the surface of the belt which faces the recording medium. This improves the uniformity of the card's motion.

As another feature of the invention, the pressure strip is implemented as a straight beam which is pivoted at one end with the radial motion of the other end being guided. This improvement in the pressure strip has the advantage that it does not require any winding guide elements and that in stressing the pressure strip toward the conveyor, a single spring (e.g., a leaf spring) may be used.

A stop has been provided to limit the swing of the moving end of the beam towards the conveyor belt so that they do not come into contact. Contact between the pressure strip and the belt would cause unnecessary wear on both elements.

As another feature of the invention, the beam has a rectangular cross-section whereby a narrow face of the beam faces the closed-loop conveyor. On the one hand, this has the advantage that only a small, flat friction surface is present between the moving recording medium and the pressure strip. On the other hand, there is a further advantage in a beam design which leaves sufficient space for the evaluation device.

The pressure strip is advantageously coated with a synthetic material at least on the side which faces the conveyor belt. The coefficient of friction for this coating must be small relative to that of the recording medium. This means that only a small force is required to overcome the friction between the recording medium and the pressure strip; this force is markedly smaller than the driving force gained by using the pressure strip to push the card against the conveyor belt. A synthetic coating on the pressure strip also has the advantage that it is very wear resistant.

As a still further feature of the invention, free-spinning rollers are provided at least in the region of the entrance and the exit/reversal point. These supply additional pressure between the recording medium and the conveyor belt in the areas where the card is being accelerated, thereby minimizing the slip between the belt and the card.

The particular embodiment hereinafter described employs a magnetic card reader as the evaluation device.

DETAILED DESCRIPTION OF THE PREFERRED EMBODIMENTS

Figure 1:
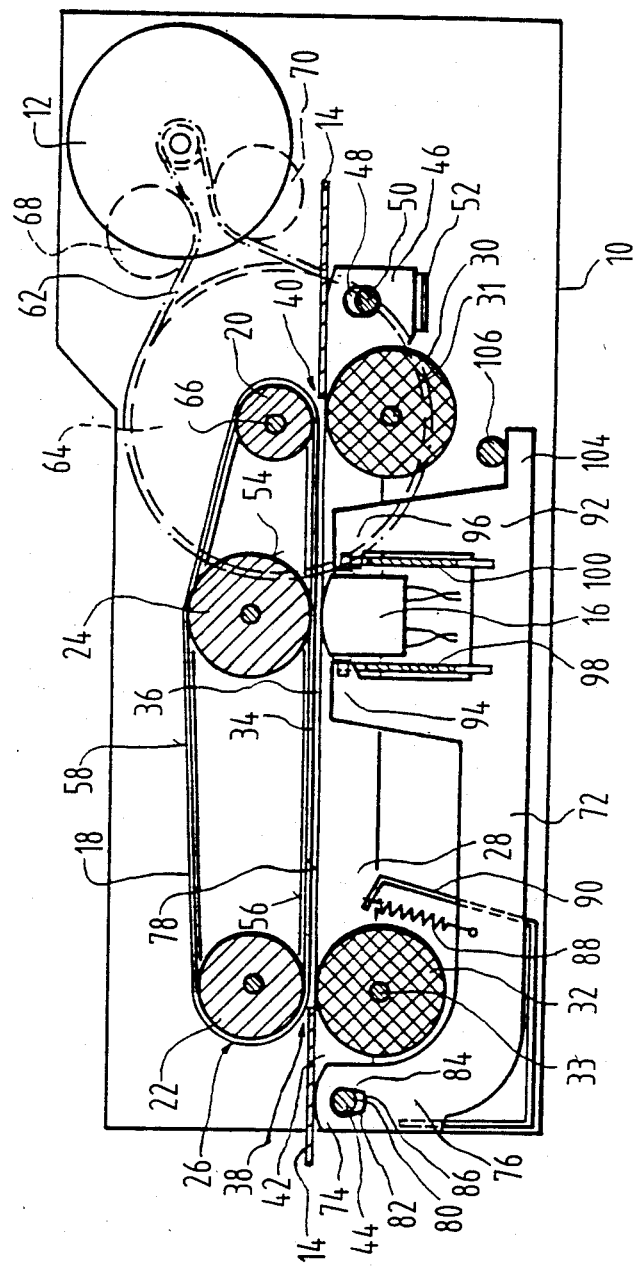
FIG. 1 shows the longitudinal cross-section of a magnetic card reader along the line of I—I in FIG. 2.

FIG. 1 shows a magnetic card reader in a housing (10). The drive motor (12) for the closed-loop conveyor (26) is inside the housing (10), and a mechanism is provided to press an evaluation device up against the recording medium (14) which is moved relative to the fixed heads. The evaluation device is made up of magnetic read/write heads (16), but only one is shown in cross-section in FIG. 1. The closed-loop conveyor (26) consists of a conveyor belt (18), a leading pulley (20), a trailing pulley (22), and a supporting roller (24). Furthermore, the device is equipped with a pressure strip (28) and two free-spinning pressure rollers (30, 32), the axis (31) of one roller (30) is fastened to the pressure strip (28). A section (34) bordered by the conveyor belt

(18) and the pressure strip (28) forms a linear Path (36) between the inlet (38) and the exit/reversal point (40), but which could be shorter than shown in the drawings. The magnetic card (14) is driven along this path (36) by the conveyor belt (18) past the magnetic read heads (16). At the exit/reversal point (40), the card (14) is either ejected or the motion of the belt (18) is reversed, the card is passed over the heads again, and it is then ejected out the entrance (38).

In order that the magnetic card (14) be conveyed by friction between it and the conveyor belt (18), it is necessary that the card (14) be pressed up against the belt (18). This is achieved over the entire transport path (36) by the pressure strip (28). This is implemented as a straight beam pivoted near one end (46) with an axis of rotation (44) and guided at the other end by a slot (48). Rotational motion is limited by a stop (50) which prevents the pressure strip from striking the conveyor belt. The pressure strip (28) is loaded by a leaf spring (52) which acts at the pivoted end (46) and forces the pressure strip toward the conveyor belt (18).

In order to minimize the frictional forces between the moving magnetic card (14) and the pressure strip (28), a narrow face of the beam (which has a rectangular cross-section) is turned toward the magnetic card. In addition, this narrow face is coated with a wear-resistant synthetic whose coefficient of friction is low compared to that of the card.

The pressure rollers (30, 32) are supplied in addition to the pressure strip (28) in the regions around the entrance (38) and the exit/reversal point (40). These rollers supply additional pressure in these regions of acceleration by pushing the wide surface of the card up against the belt. In order to insure a surge-free motion of the card through the reader, these rollers (30, 32) should be made out of a flexible synthetic material such as Zellvulkollan.

The conveyor belt (18) is diverted by the trailing pulley (20) near the exit/reversal point (40) and by the leading pulley (22) in the area around the inlet (38). It is also guided by the roller (24) located opposite the magnetic heads (16) and pushing against the inner surface of the conveyor belt (18). Roller (24) pushes the belt slightly outward toward the pressure strip (28). This insures that the taut belt (18) pushes especially firmly on the card (14) as it passes by the magnetic read heads (16).

The conveyor belt (18) is produced essentially from a flexible synthetic material, preferably a soft polyurethane mixture, which has a high coefficient of friction relative to that of the magnetic card (14). It should be extruded as thin as possible so that the pulling rope of the conveyor belt (18) lies as close to the exterior surface (58) as possible. This is achieved and the belt is strengthened by providing the conveyor belt with a pulling rope which lies near the exterior surface (50); the rope should be made of steel cord or Kevlar which is relatively inelastic.

The magnetic card (14) is guided along the linear transport path (36) past the magnetic read heads (16), which by means of the above-explained pressure device, comes into position against the magnetic card (14). The major component of the pressure strip is a lever (72) which is designed essentially in a U-shape. Through this lever (72), the free end (74) of the arm (76) nearest the plane of transport is held on the swinging axle (44) and guided by a slot (80). The edges (82, 84) of the slot (80) diverge in the direction of the transport plane, and at the end of the slot farthest away form the transport plane, the slot is narrower than the diameter of the axle (44). In order to mount the lever (72) so that it moves freely towards the magnetic card (14), the edges (82, 84) of the slot (80) must be pressed up against the swinging axle (44). This is obtained by correctly lining up the leaf springs (88) which are suspended on a trap (90).

The other arm (92) of the essentially U-shaped lever (72) is shaped like a fork, and it carries a magnetic read/write head at the end of the fork tines. The head is moved together with the lever (72), guided by two plates (98, 100) toward the conveyor belt.

The free end (102) of the lever (72) is equipped with a stop pin. This comes up against a stationary stop (106), thereby limiting the motion of the pressure lever (72) towards the plane of transport.

Figure 2:
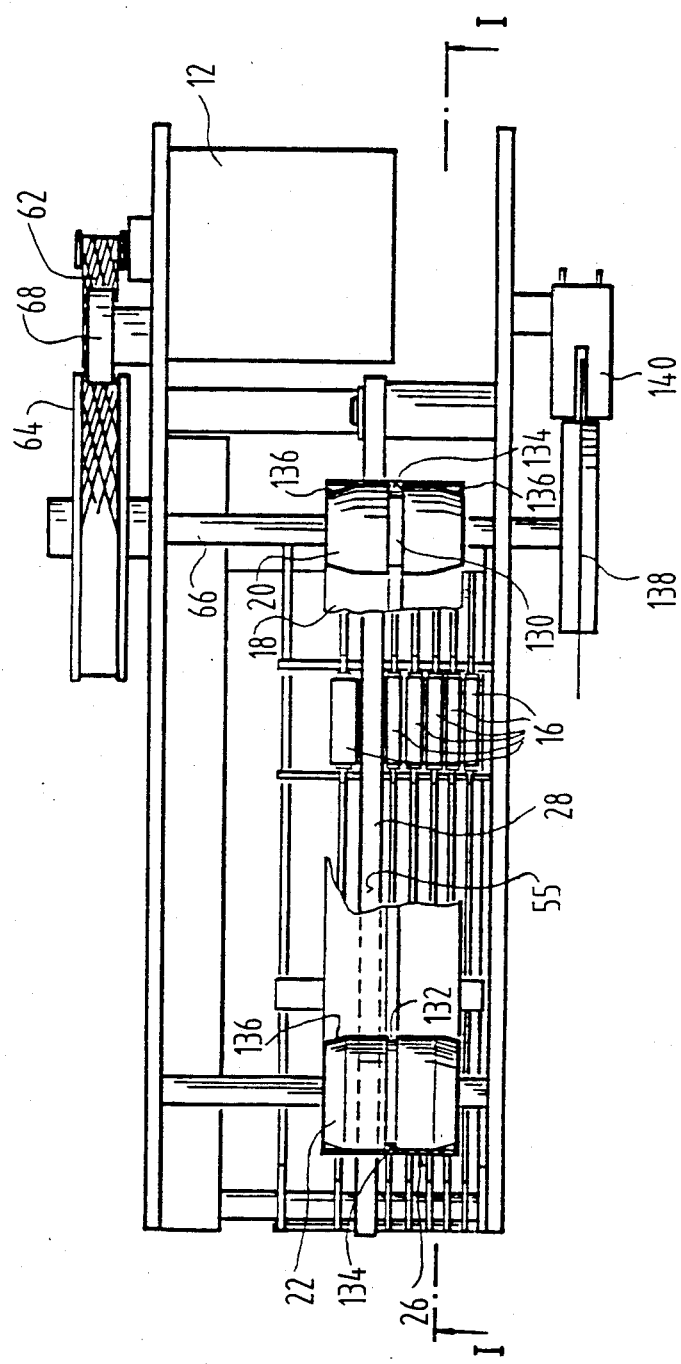
FIG. 2 shows the top view of a magnetic card reader in accordance with the present invention.

FIG. 2 shows the top view of the magnetic card reader which particularly illustrates the arrangement of the pressure strip (28) and the closed-loop conveyor (26) with respect to the reader. Also shown in FIG. 2 are the drive motor (12), drive belt (62), tensioning pulley (68), and drive pulley (64). The axle through the drive pulley powers the driving roller (20) which causes the motion of the conveyor belt (18) which is only partially shown here. The belt is trained around the leading pulley (22) which is free-spinning. The leading and trailing pulleys (20, 22) as well as the support roller (24), which is not shown in FIG. 2, are equipped with a groove (130, 132) in which the guide rib (134) of the conveyor belt (18) travels. The guide rib and grooves combine to prevent side-to-side drift of the conveyor belt. The same effect is enhanced by the fact that both pulleys (20, 22) are both tapered to truncated cones on either side of the bisecting diametrical plane, this may be seen at 136. The height of these pulleys is also approximately the same as the width of the conveyor belt (18); this is also about the same as the total width of the evaluation device which is composed of magnetic read/write heads (16).

The numeral 138 indicates a scanning disc which is partly extended in the interior of the light barrier (140). This arrangement of scanning disc (138) and light barrier (140) yield the angular velocity of the driven axle (66). This is necessary for the synchronized control of the drive motor (12) and the closed-loop conveyor (26).

What is claimed is:

1. A device for frictionally conveying a card-shaped, essentially ridged recording medium relative to an evaluation device which is disposed along a path between an inlet and an outlet, comprising:
    a linear conveyor path (36) which is bordered on (the) one side thereof by a section of a closed-loop conveyor (26) and on the other side thereof by a pressure strip (28) which runs approximately parallel to the path (36) and is biased toward the conveyor (26) with the aid of a pressure device (52), the conveyor (26) including a pair of pulleys (20, 22) respectively disposed at opposite extremities of the linear conveyor path (36) and a conveyor belt (18) trained around the pulleys (20, 22) the pulleys (20, 22) each including a circumferential groove (130, 132) therein, the conveyor belt (18) including a guide rib (134) lying within the circumferential groove (130, 132) of each of the pulleys (20, 22) and cooperating with the grooves (130, 132) to maintain alignment of the conveyor belt (18) relative to the pulleys 20, 22).

2. A device as recited in claim 1, wherein the evaluation device (16) is positioned between the pulleys (20, 22).

3. A device as recited in claim 2, including a supporting frree-spinning roller (24) disposed opposite to the evaluation device (16), the circumferential surface (54) of the roller engaging the inner side of the conveyor belt (18).

4. A device as recited in claim 3, wherein conveyor belt (18) is deflected outward by the supporting roller (24) toward the pressure strip (28).

5. A device as recited in claim 4, wherein pulleys (20, 22) and supporting roller (24) have the same diameter.

6. A device as recited in claim 3, wherein the supporting roller (24) includes at least one circumferential groove (130, 132) therein, in which the guide rib (134) of the conveyor belt (18) lies.

7. A device as recited in claim 3, wherein the width of the pulleys (20, 22) and roller (24) corresponds substantially to the width of the conveyor belt (18).

8. A device as recited in claim 2, wherein at least one of the two rollers is tapered in the shape of a truncated cone on both sides of the diametrical plane which bisects the roller.

9. A device as recited claim 1, wherein the width of the conveyor belt (18) corresponds very closely to the width of the evaluation device (16).

10. A device as recited in claim 2, wherein the thickness of the conveyor belt (18) is less than 1 millimeter.

11. A device as recited in claim 2, wherein the conveyor belt (18) is made of a flexible synthetic material.

12. A device as recited in claim 2, wherein the conveyor belt (18) includes at least one essentially inelastic pulling rope.

13. A device as recited in claim 12, wherein the pulling rope within the conveyor belt (18) lies near the exterior surface of the belt.

14. A device as recited in claim 1, wherein the pressure strip (28) is defined by a straight beam which is pivoted at one end and guided along the direction of rotation at the other end.

15. A device as recited in claim 1, wherein the pressure device (52) is defined by a spring.

16. A device as recited in claim 14, including a stop (50) which limits the motion of the swinging end (46) of the beam (28) toward the conveyor belt.

17. A device as recited in claim 14, wherein the beam (28) has a rectangular cross-section and includes a narrow side (55) facing the closed-loop conveyor belt (18).

18. A device as recited in claim 1, wherein the pressure strip (28) is coated with a synthetic material at least on the side (55) which faces the conveyor belt (26), the coefficient of friction of the coating being small relative to that of the recording medium.

19. A device as recited in claim 1, including a free-spinning roller (30, 32) supplying force in addition to that from the pressure strip (28) between the recording medium (14) and the conveyor belt (26) in the region of the inlet and the outlet.

20. A device as recited in claim 19, wherein the pressure rollers (30, 32) comprise an elastic synthetic material.

* * * * *